US008718609B2

(12) United States Patent
Yang et al.

(10) Patent No.: US 8,718,609 B2
(45) Date of Patent: May 6, 2014

(54) METHOD AND MOBILE TERMINAL FOR PROCESSING DATA IN MESSAGE

(71) Applicant: Huawei Device Co., Ltd., Guangdong (CN)

(72) Inventors: Ning Yang, Shenzhen (CN); Yi Ding, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/731,790

(22) Filed: Dec. 31, 2012

(65) Prior Publication Data
US 2013/0183940 A1    Jul. 18, 2013

Related U.S. Application Data

(63) Continuation of application No. PCT/CN2012/070293, filed on Jan. 12, 2012.

(51) Int. Cl.
*H04M 1/725*     (2006.01)
*H04W 4/00*      (2009.01)
*H04M 1/00*      (2006.01)

(52) U.S. Cl.
USPC ............. 455/412.1; 455/412.2; 455/466; 455/550.1

(58) Field of Classification Search
USPC ............. 455/412.1–412.2, 414.1–414.4, 455/418–420, 466, 514, 517, 550.1, 556.2, 455/423–425, 434, 551, 558, 560–561; 370/310, 328, 338, 349, 471, 473
See application file for complete search history.

(56) References Cited

U.S. PATENT DOCUMENTS

| | | | | |
|---|---|---|---|---|
| 2002/0029300 A1* | 3/2002 | Okada et al. | ........... | 709/318 |
| 2006/0200528 A1* | 9/2006 | Pathiyal | ........... | 709/206 |
| 2006/0212286 A1* | 9/2006 | Pearson et al. | ........... | 704/9 |
| 2007/0101284 A1* | 5/2007 | Shaw et al. | ........... | 715/772 |
| 2007/0286370 A1* | 12/2007 | Kauppinen et al. | ........... | 379/142.01 |

(Continued)

FOREIGN PATENT DOCUMENTS

| | | |
|---|---|---|
| CN | 101252619 A | 8/2008 |
| CN | 101483589 A | 7/2009 |

OTHER PUBLICATIONS

Foreign communication from a counterpart application, PCT application PCT/CN2011/070293 English Translation International Search Report dated Oct. 25, 2012, 2 pages.

(Continued)

*Primary Examiner* — Meless Zewdu
(74) *Attorney, Agent, or Firm* — Conley Rose, P.C.; Grant Rodolph; Rayhao Chung (57) ABSTRACT

The present invention relates to the field of data processing, and in particular, to a method for processing data in a message. The method includes: receiving a message sent by a network side or another equipment, wherein the message carries data; identifying a data type of the data; and storing the data into a function module corresponding to the data type according to a corresponding relationship list, wherein the corresponding relationship list is a list of correspondence between the data types and the function module. Meanwhile, an embodiment of the present invention further provides a mobile terminal for processing data in a message. With embodiments of the present invention, the intelligent interaction capability between a mobile terminal and a user is enhanced, and the transaction processing efficiency of the mobile terminal is also improved.

15 Claims, 7 Drawing Sheets

(56) References Cited

U.S. PATENT DOCUMENTS

| | | |
|---|---|---|
| 2008/0201664 A1* | 8/2008 | O .................................. 715/835 |
| 2009/0037413 A1* | 2/2009 | Castell et al. ..................... 707/7 |
| 2010/0057643 A1* | 3/2010 | Yang .............................. 706/11 |
| 2010/0146459 A1* | 6/2010 | Repka .......................... 715/863 |
| 2010/0317326 A1* | 12/2010 | Park et al. ................... 455/412.1 |
| 2012/0101818 A1* | 4/2012 | Scott et al. .................... 704/231 |

OTHER PUBLICATIONS

Foreign Communication From a Counterpart Application, PCT Application PCT/CN2012/070293, Partial English Translation of Written Opinion dated Oct. 25, 2012, 5 pages.

* cited by examiner

METHOD AND MOBILE TERMINAL FOR PROCESSING DATA IN MESSAGE

CROSS-REFERENCE TO RELATED APPLICATIONS

This application is a continuation of International Application Ser. No. PCT/CN2012/070293, filed on Jan. 12, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of data processing, and in particular, to a method and a mobile terminal for processing data in a message.

BACKGROUND

As mobile communication technologies are widely used in real life, more and more users choose to carry mobile terminals (such as a mobile phone or a tablet computer) as necessary communication devices every day to receive short message services (SMS for short below) from family members, friends or colleagues, receive and send electronic mail (email), answer and make phone calls, and so on. Especially, as smart phones and tablet computers are gradually popularized nowadays, mobile terminal users increasingly rely on the mobile terminals to handle daily businesses or life affairs, for example, use a mobile phone calendar to schedule meetings, use a mobile phone to store electronic business cards of others, or record various sorts of information in a notepad.

The mobile terminal users receive various messages (such as SMS, emails and contact calls) every day, and these messages may contain data such as telephone numbers, websites, Email addresses or electronic business cards in a vCard format; if the data needs to be stored, in the conventional art, a mobile terminal user needs to store the data one by one manually into a memory of the mobile terminal through a graphical user interface (GUI for short below). Such a data processing method greatly reduces an intelligent interaction capability between a mobile terminal and a user, and also reduces data processing efficiency of the mobile terminal.

SUMMARY

Accordingly, embodiments of the present invention provide a method and a mobile terminal for processing data in a message, so as to solve a problem of a low intelligent interaction capability between a mobile terminal and a user, and low data processing efficiency in the prior art.

An embodiment of the present invention provides a method for processing data in a message. The method includes: receiving a message sent by a network side or another equipment, wherein the message carries data; identifying a data type of the data; and storing the data into a function module corresponding to the data type according to a corresponding relationship list, wherein the corresponding relationship list is a list of correspondence between the data types and the function module.

Meanwhile, an embodiment of the present invention provides a mobile terminal for processing data in a message. The mobile terminal includes: a memory that comprises at least one function module, wherein the function module is configured to store the data sent by a central processing unit; a RF circuit configured to receive a message, wherein the message carries data; and the central processing unit configured to: identify a data type of the data; and store the data into a function module corresponding to the data type of the data according to a corresponding relationship list, wherein the corresponding relationship list is a list of correspondence between data types and function modules With the embodiments of the present invention, related data, such as contact information, schedule information and text information, is intelligently extracted from a received message, and the data is stored into a corresponding function module, so that an intelligent interaction capability between a mobile terminal and a user is enhanced, and the transaction processing efficiency of the mobile terminal is improved.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from the accompanying drawings without creative efforts.

DETAILED DESCRIPTION

To make the objectives, features, and advantages of the present invention clearer, the following describes the embodiments of the present invention in detail with reference to accompanying drawings.

The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items.

Embodiment 1

Figure 1:
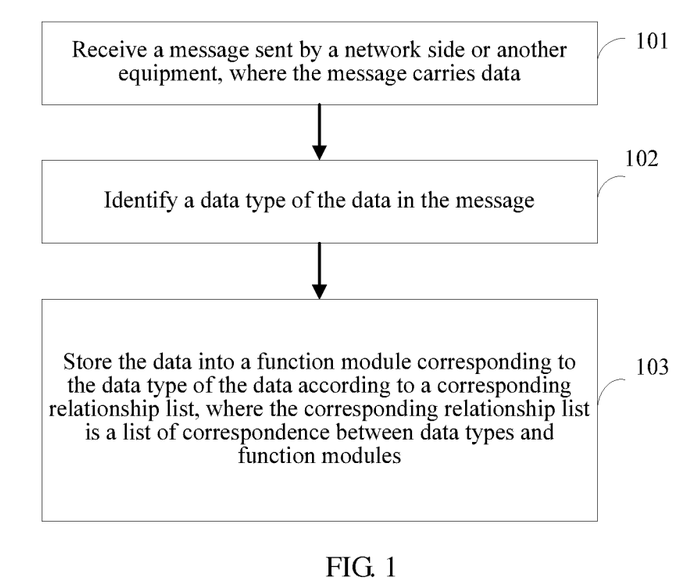
FIG. 1 is a flow chart of a method in Embodiment 1 of the present invention.

Embodiment 1 of the present invention provides a method for processing data in a message, and referring to FIG. 1, the method specifically includes the following steps:

Step 101: A mobile terminal receives a message sent by a network side or another equipment, where the message carries data. For persons skilled in the art, the mobile terminal may communicate in a wireless manner with wireless networks, such as Internet, wireless local area networks (WLAN for short below), cellular mobile phone networks, and with another device through various wireless communication protocols. Wireless communication may use any one of multiple communication standards, protocols and technologies. These communication standards, protocols and technologies include, but are not limited to, global system for mobile communication (GSM for short below), enhanced data rate for GSM evolution (EDGE for short below), high speed downlink packet access (HSDPA for short below), wideband code division multiple access (WCDMA for short below), code division multiple access (CDMA for short below), time division multiple access (TDMA for short below), Bluetooth standards, wireless fidelity (Wi-Fi for short below), protocols for emails (such as an Internet message access protocol (IMAP for short below) and a post office protocol (POP for short below), protocols for instant messaging presence services (IMPS for short below), protocols for short message services, or any other standards, protocols and technologies applicable to wireless communication.

A mobile terminal may communicate in a wireless manner with a network side through the above various wireless communication standards, protocols and technologies, and may receive messages sent by the network side. These received messages include, but are not limited to, an email, a SMS, and an instant message (IM for short below), and so on. The mobile terminal may also receive Bluetooth information or Wi-Fi information, where the Bluetooth information is packaged through a Bluetooth standard protocol by another mobile terminal or other equipment and the Wi-Fi information is sent through a Wi-Fi protocol by another mobile terminal or other equipment. Persons skilled in the art may learn that, a received message may carry data of multiple data types. For example, it could be data of only one data type, or data of two or more data types.

Step 102: The mobile terminal identifies a data type of the data in the message.

After receiving each of the above messages, the mobile terminal parses the message, and may identify the data type of the data in the message. The data type refers to a format of the data, for example, the data type may be a text (TXT for short below) format, a vCard (Virtual Card for short below) format, a vCalendar (Virtual Calendar for short below) format, a Bitmap (BMP) format, a JPG format, an Audio Video Interleaved (AVI for short below) format, an RealMedia Variable Bitrate (RMVB for short below) format, an Moving Picture Experts Group (MPEG for short below) format, and so on.

The mobile terminal may identify the data type of the data in the message according to the prior art. For example, the message is a short message service and carries data in the vCard format, and the mobile terminal may identify the data in the vCard format from the short message service.

The vCard is referred to as a virtual business card or an electronic business card, which is a file format standard of a contact electronic business card. The vCard may include information, such as a name, address information, a telephone number, Uniform Resource Locator (URL for short below), logo, and a photo. The specification of the vCard allows public exchange of personal data interchange (PDI for short below) information. Data in the vCard format may be transmitted in any information through various wireless communication manners, for example, a message, such as an email or a short message service sent by the network side may also include data in the vCard format.

The mobile terminal identifies whether data in the vCard format is in the received SMS by parsing the received SMS and determining whether a "BEGIN:VCARD" character string is included in the message. Of course, persons skilled in the art may understand that, the mobile terminal may also identify whether data in the vCard format is in the message by parsing the received message and determining whether an "END:VCARD" character string is included in the message. The embodiment of the present invention does not limit the method for identifying data in the vCard format.

For another example, the message received by the mobile terminal may also include calendar data in the vCalendar format. An RFC 5545 (Internet Calendaring and Scheduling Core Object Specification) is a standard of calendar data exchange; the RFC 5545 defines content, such as a specific format of iCalendar or vCalendar. Generally, the vCalendar allows a user to send a "meeting request" or "task" to an addressee through an email. However, the vCalendar may also be used independently without being limited to a certain transmit protocol. For example, sharing and modification may be implemented through a WebDav server or a mobile data synchronization protocol (SyncML for short below). A web server (HTTP protocol) is also usually used to distribute public event data in the vCalendar format, or release a personal time planning schedule.

By parsing the received message (such as an Email) and determining whether a "BEGIN:VCALENDAR" character string is included in the message, the mobile terminal identifies whether data in the vCalendar format is in the received email. Of course, persons skilled in the art may understand that, the mobile terminal may also identify whether data in the vCalendar format is in the received email by parsing the received message and determining whether an "END:VCALENDAR" character string is included in the message. The embodiment of the present invention does not limit the method for identifying data in the vCalendar format.

For another example, the mobile terminal receives a short message service, and may identify that the short message service includes data of a numeric character string type. For example, the short message service may include the following content: "Zhang San, my telephone number is changed to 123456789 . . . " and the mobile terminal may identify the numeric character string "123456789".

For another example, the mobile terminal receives a phone call (such as a missed call or an answered call) which is stored in a call log in the form of a telephone message. The mobile terminal may identify data in the call log.

For another example, the mobile terminal receives a multimedia messaging service (MMS for short below). The multimedia messaging service may deliver content of various formats; the information includes information in various multimedia formats, such as text, image, sound, and data. The mobile terminal may identify data of a TXT file in the multimedia messaging service through the file name extension ".TXT", and may identify data in image formats in the multimedia messaging service through image formats with file name extensions such as ".JPG", ".BMP", ".TIFF" and ".GIF".

Step 103: The mobile terminal stores the data into a function module corresponding to the data type of the data according to a corresponding relationship list, where the corresponding relationship list is a list of correspondence between data types and function modules.

The data type refers to the format of the data, for example, the data type may be a TXT format, a vCard format, a vCalendar format, a BMP format, a JPG format, an AVI format, an RMVB format, an MEPG format, and so on. The function module refers to the module capable of storing the data of the above data types, and the function module is a part of an internal structure of the mobile terminal. For example, the mobile terminal is a mobile phone, and an address book module is stored in the memory of the mobile phone. Persons skilled in the art may learn that, the address book module may store data in a Visual Component Framework (vcf for short below) format, and contact information is stored in the data in the vcf format. The contact information may be information, such as a name and a telephone number. Meanwhile, the address book module may also store data in the vCard format. For another example, a notepad module is stored in the memory, and the notepad module may store data in the TXT format. The correspondence between data types and function modules is stored in the corresponding relationship list, for example, the TXT format is corresponding to the notepad module; the vCard format is corresponding to the address book module; the BMP format and the JPG format are corresponding to an image management module; the AVI format, the RMVB format, and the MEPG format are corresponding to a player module.

Table 1 shows a list of correspondence between data types and function modules, where a function module is a part of the internal structure of the mobile terminal. Specifically, for example, a short message service may include data in the TXT format, and may also include data in the vCard format. When the mobile terminal identifies that the received short message service includes data in the vCard format, the type of data in the vCard format is corresponding to an address book module according to the corresponding relationship list 1, and then the data in the vCard format is stored into the address book module. For example, when the mobile terminal identifies that the received message includes data in the TXT format, the type of data in the TXT format is corresponding to a notepad module according to the corresponding relationship list 1, and then the data in the TXT format is stored into the notepad module. When the mobile terminal identifies that the data in the short message service is data in a numeric character string format, it is found that the data in the numeric character string format is corresponding to the address book module according to the corresponding relationship list 1 between data types and function modules, and then the data in the numeric character string format is stored into the address book module. For another example, when the mobile terminal identifies that the received message includes both data in the TXT format and data in the vCard format, the data in the TXT format is stored into the notepad module according to the corresponding relationship list 1, and the data in the vCard format is stored into the address book module. Detailed description is provided in the subsequent steps.

TABLE 1

| Data type | Function module |
| --- | --- |
| vCard, numeric character string | Address book module |
| TXT | Notepad module |
| vCalendar | Calendar module |
| BMP, JPG, TIFF, GIF | Image management module |
| AVI, RMVB, MPEG | Player module |

For another example, the mobile terminal receives a phone call (such as a missed call or an answered call) which is stored in the call log (call log) in the form of a telephone message. The mobile terminal may identify data in the numeric character string format from the call log. According to the corresponding relationship list 1 between data types and function modules, it is found that the data in the numeric character string format is corresponding to the address book module, and then the data of the telephone message is stored into the address book module.

For another example, the mobile terminal receives an MMS message, and identifies that data in the image format (such as JPG, BMP, TIFF and GIF formats) is included in the multimedia messaging service through the image formats with the file name extensions ".JPG", ".BMP", ".TIFF", ".GIF", and so on. The mobile terminal finds that data in the JPG format, the BMP format, the TIFF format, and the GIF format is corresponding to an image management module according to the corresponding relationship list 1 between data types and function modules, and then stores the data in the JPG format, the BMP format, the TIFF format, and the GIF format into the image management module.

For another example, the message received by the mobile terminal includes data in the AVI format. The mobile terminal finds that the data in the AVI format is corresponding to the player module according to the corresponding relationship list 1 between data types and function modules, and then stores the data in the AVI format into the player module.

In some other embodiments, the list of correspondence between data types and function modules may be stored at the network side or stored locally. When the corresponding relationship list is stored at the network side, the mobile terminal acquires, according to the identified data type of the data, information of a function module corresponding to the data type from the network side, and stores the data into the function module.

In some other embodiments, when the message includes data of multiple data types, identifying the data type of the data in step 102 may specifically include: identifying at least one data type of the data. Therefore, in step 103, storing the data into the function module corresponding to the data type according to the corresponding relationship list may specifically include: storing the data of at least one data type into the function module corresponding to the data type according to the corresponding relationship list.

With the embodiment of the present invention, data of various data types, such as contact business card vCard, schedule information vCalendar, text information TXT is identified from the received message, and the data is stored into function modules related to the mobile terminal, thereby enhancing the intelligent interaction capability between the mobile terminal and the user, and also improving the transaction processing efficiency of the mobile terminal.

Figure 2:
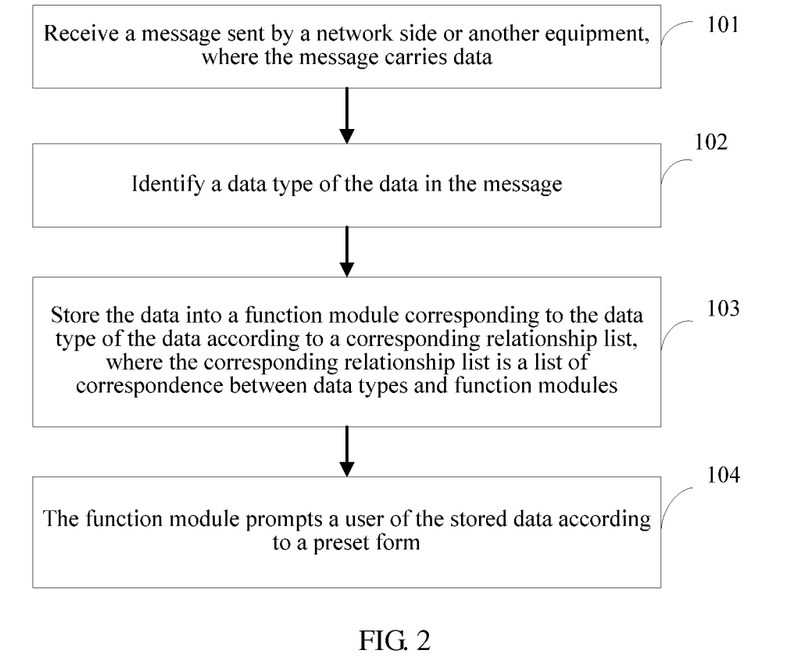
FIG. 2 is another flow chart of a method in Embodiment 1 of the present invention.

Optionally, as shown in FIG. 2, after step 103, the method of the embodiment may further include the following steps:

Step 104: The function module prompts the user of the stored data according to a preset form.

For example, the function module may also be a calendar module. After the calendar module stores the data in the vCalendar format, a schedule is generated in the calendar module according to the preset form and a prompt is given to the user.

For example, the function module may also be a notepad module. After the notepad module stores the data in the TXT format, note information is generated in the notepad module according to the preset form and a prompt is given to the user.

In some other embodiments, the function module may also prompt the user of the stored data in the preset form according to a received operation command. The operation command may specifically command the function module to display the data. For example, specifically, the function module may be an address book module. After the address book module receives the operation command that commands the address book module to display the data, a contact is generated in an address book on the basis of the data in the vCard format and the numeric character string format, and a prompt may be given to the user according to a contact display form preset by the mobile terminal.

Figure 3:
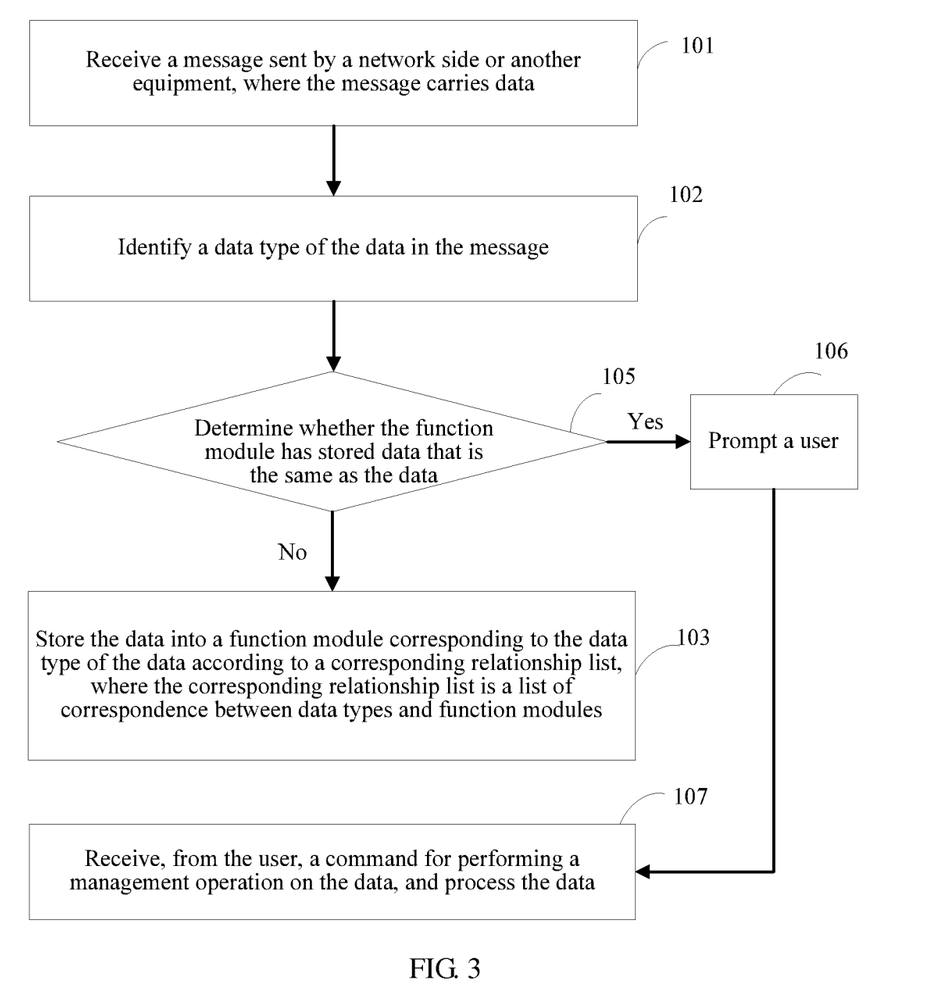
FIG. 3 is another flow chart of a method in Embodiment 1 of the present invention.

Optionally, as shown in FIG. 3, after step 102 and before step 103, the method may further include the following steps:

Step 105: Determine whether data that is the same as the data is already stored in the function module; if the data is already stored, perform step 106; if the data is not stored yet, perform step 103.

Step 106: Prompt the user, so that the user performs a management operation on the data. The prompting manner may specifically be: displaying a graphical user interface in a touch screen, prompting the user that the same data already exists in the function module, prompting the user whether to continue a storing operation, and so on. For example, the function module is specifically an address book module. After the address book module receives the data in the vCard format, a contact is generated in the address book on the basis of the data in the vCard format. Of course, it may be understood that, if information of the generated contact (such as a name and a mobile phone number) is the same as a contact already stored in the address book, the mobile terminal may prompt the user to perform a corresponding management operation, for example, prompt the user whether to continue storing the generated contact, and so on.

Step 107: The mobile terminal receives, from the user, the command for performing a management operation on the data, and processes the data (for example, performing deletion processing on the data).

Figure 4:
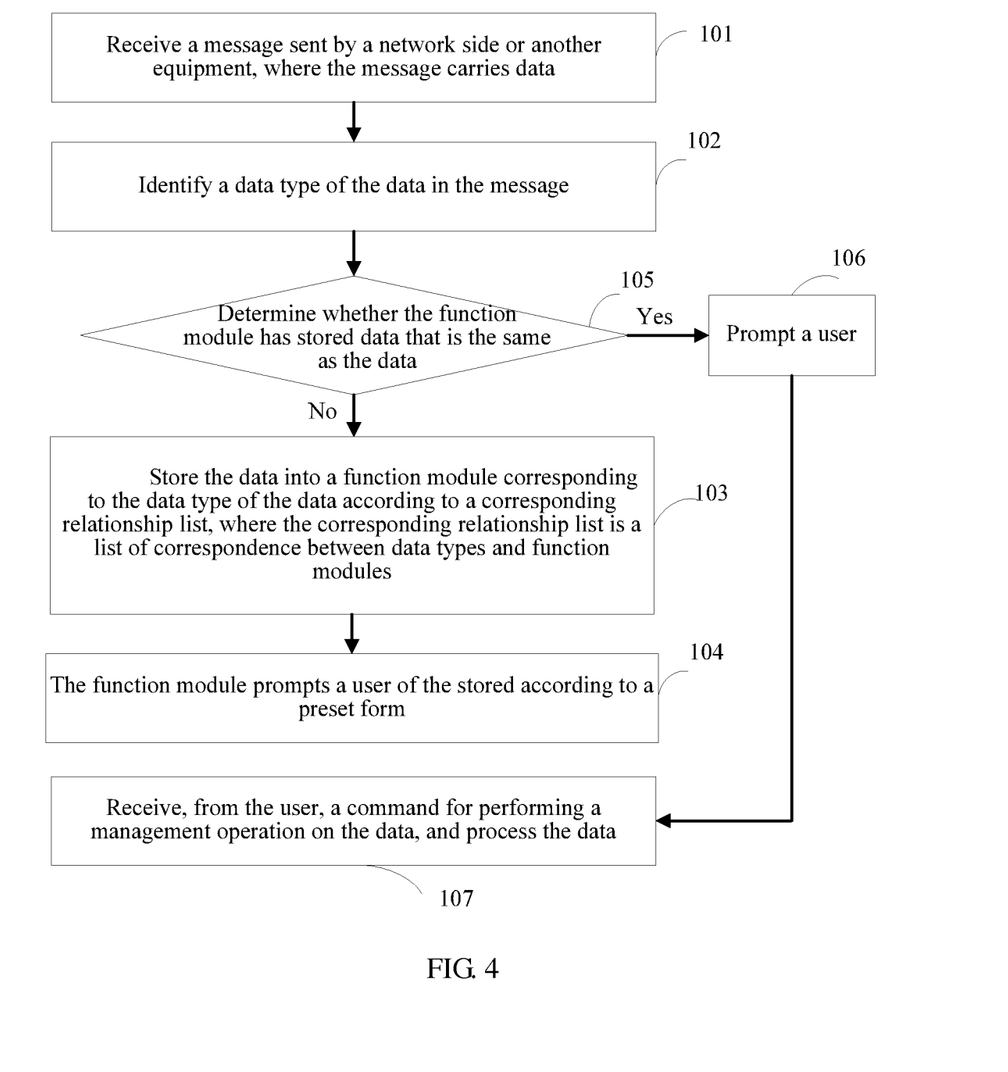
FIG. 4 is another flow chart of a method in Embodiment 1 of the present invention.

Optionally, step 104, step 105, step 106, and step 107 may all exist in the method of the embodiment of the present invention, as shown in FIG. 4, and the detailed process of the method is not described herein again.

Persons skilled in the art may learn that, a short message service, an Email and an instant message sent by the network side and received by the mobile terminal all have the same fields, for example, a sender field, an addressee field, a sending time field, a receiving time field, and a message content field.

Therefore, optionally, in some other embodiments, after step 102 and before step 103, the method may further include the following step:

Step 108: Extract a data attribute of the data from the message. The data attribute may specifically include a sender of the message, and may also specifically include the sender and the sending time of the message.

Therefore, the above step 103 may further include:

storing the data attribute of the data into the function module corresponding to the data type of the data. In this way, both the data and the data attribute of the data may be stored into the function module corresponding to the data type of the data.

In the embodiment of the present invention, the data attribute may specifically include the sender of the message, and may also specifically include the sender and the sending time of the message. For example, the mobile terminal receives a multimedia messaging service sent by the network side. The specific fields and content in the multimedia messaging service are shown in Table 2.

TABLE 2

| Multimedia messaging service field | Description |
|---|---|
| Sender | Zhang San (12345678) |
| Sending time | December 31, 2011, Saturday, 17:18 |
| Addressee | (Mobile terminal user) |
| Receiving time | December 31, 2011, Saturday, 17:22 |
| Content | Data in a GIF format, data in a TXT format |

After the mobile terminal parses the multimedia messaging service and identifies data in the GIF format and data in the TXT format in the multimedia messaging service, the data attribute (the sender, or the sender and the sending time) of the data in the GIF format and the data attribute of the data in the TXT format are extracted from the message. The data in the GIF format and the data attribute are stored into the function module corresponding to the data type of the data, and the data in the TXT format and the data attribute are stored into the function module corresponding to the data type of the data.

When the function module prompts the user of the stored data according to the preset form, the mobile terminal displays the data in the GIF format and TXT format, and also displays data attributes. A specific display form of a data attribute is not limited in the embodiment of the present invention, for example, the data attribute of the data in the TXT format and the data attribute of the data in the GIF format may be displayed as "a multimedia messaging service from Zhang San on Saturday, Dec. 31, 2011", or "from Zhang San", and so on.

The specific content in the data attribute may be preset by the mobile terminal, or may be set by the user. When data needs to be prompted to the user, the data attribute of the data may be prompted to the user. In this way, the user may intuitively learn the message source of the data, which is more beneficial to the intelligent interaction capability between the mobile terminal and the user, and meanwhile improves the use experience of the user.

In some other embodiments of the present invention, the data attribute of the data may be indicated by naming the file of the data. Still, the multimedia messaging service is taken as an example. After the data in the GIF format is identified, the file of the data is automatically named as "a multimedia messaging service from Zhang San on Saturday, Dec. 31, 2011", or "a multimedia messaging service from Zhang San", and so on.

Embodiment 2

Figure 5:
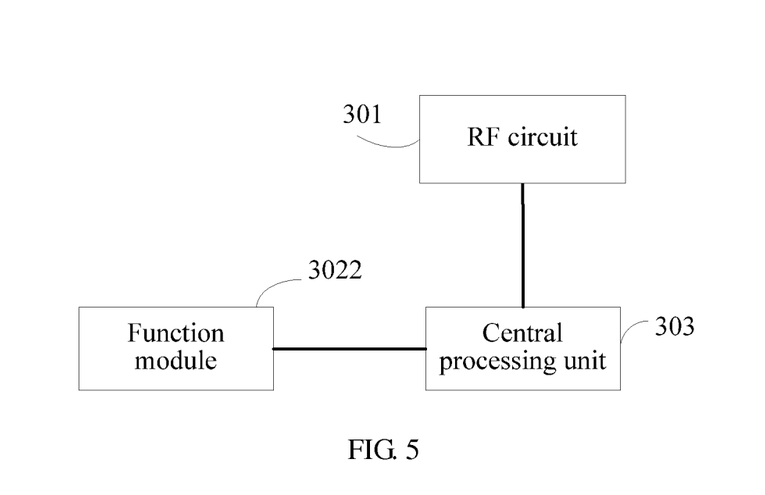
FIG. 5 is a schematic structural diagram of a mobile terminal in Embodiment 2 of the present invention.

The embodiment of the present invention provides a mobile terminal, and as shown in FIG. 5, the mobile terminal specifically includes an RF circuit 301, a memory 302, and a central processing unit 303. The memory 302 includes at least one function module 3022.

The RF circuit 301 is configured to receive a message, where the message carries data. The message may include the data of multiple data types: data of only one data type may be included, or data of two or more data types may be included. The message may specifically include an email, a short message service, or an instant message.

The central processing unit 303 is configured to identify the data type of the data in the message received by the RF circuit 301, and store the data into a function module corresponding to the data type of the data according to a corresponding relationship list. The corresponding relationship list is a list of correspondence between data types and function modules. For detailed content of the corresponding relationship list, reference may be made to the related content in Embodiment 1, and details are not described herein again.

The function module 3022 is configured to store the data.

The function module 3022 includes at least one of a notepad module, an address book module, a calendar module, an image management module or a player module.

Figure 6:
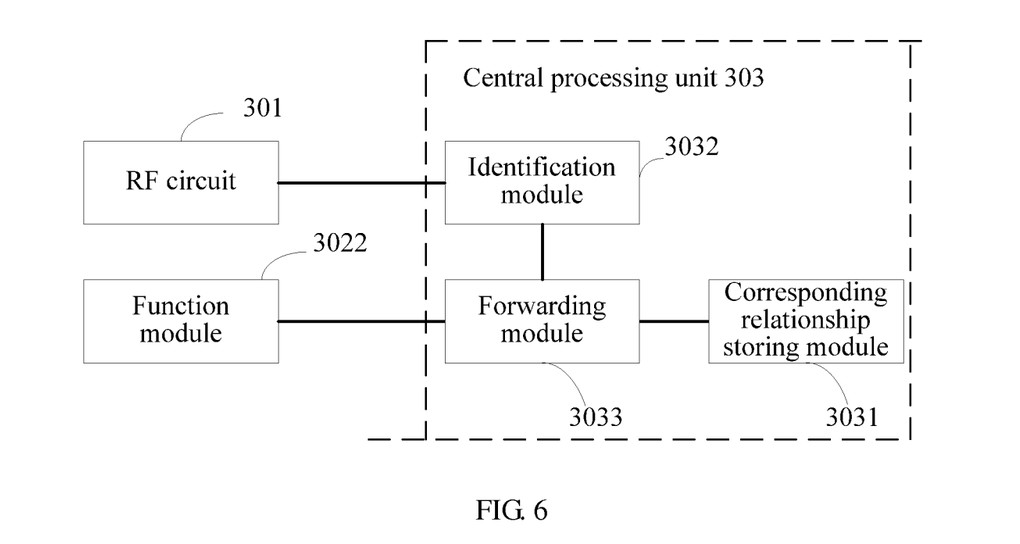
FIG. 6 is a schematic internal structural diagram of a central processing unit in Embodiment 2 of the present invention.

Optionally, as shown in FIG. 6, the central processing unit 303 specifically includes: a corresponding relationship storing module 3031, configured to store the list of correspondence between data types and function modules; an identification module 3032, configured to identify the data type of the data in the message; and a forwarding module 3033, configured to store the data into the corresponding function module 3022 according to the corresponding relationship list.

Optionally, the mobile terminal may further include a display 304, where the display 304 is configured to display the data stored in the function module 3022 to a user according to an operation command of the central processing unit 303.

It may be understood that, in the embodiment of the present invention, the received message may specifically be the short message service, instant message, email, multimedia messaging, and so on in Embodiment 1, and the identified data may also be the data in the vCard format, the vCalendar format, the JPG format, the BMP format, the TIFF format, the GIF format and the TXT format in Embodiment 1. It may be understood that, the specific technical solution in the method embodiment 1 may be implemented in the mobile terminal of the embodiment of the present invention. The specific technical solution is described in detail in Embodiment 1, and is not described herein again.

In addition, it may be further understood that, the above function module 3022 in the embodiment of the present invention may be a part in the memory, and it is also possible that the function module 3022 and the memory 302 are two hardware structures independent of each other, and the embodiment of the present invention is not limited thereto.

Embodiment 3

Figure 7:
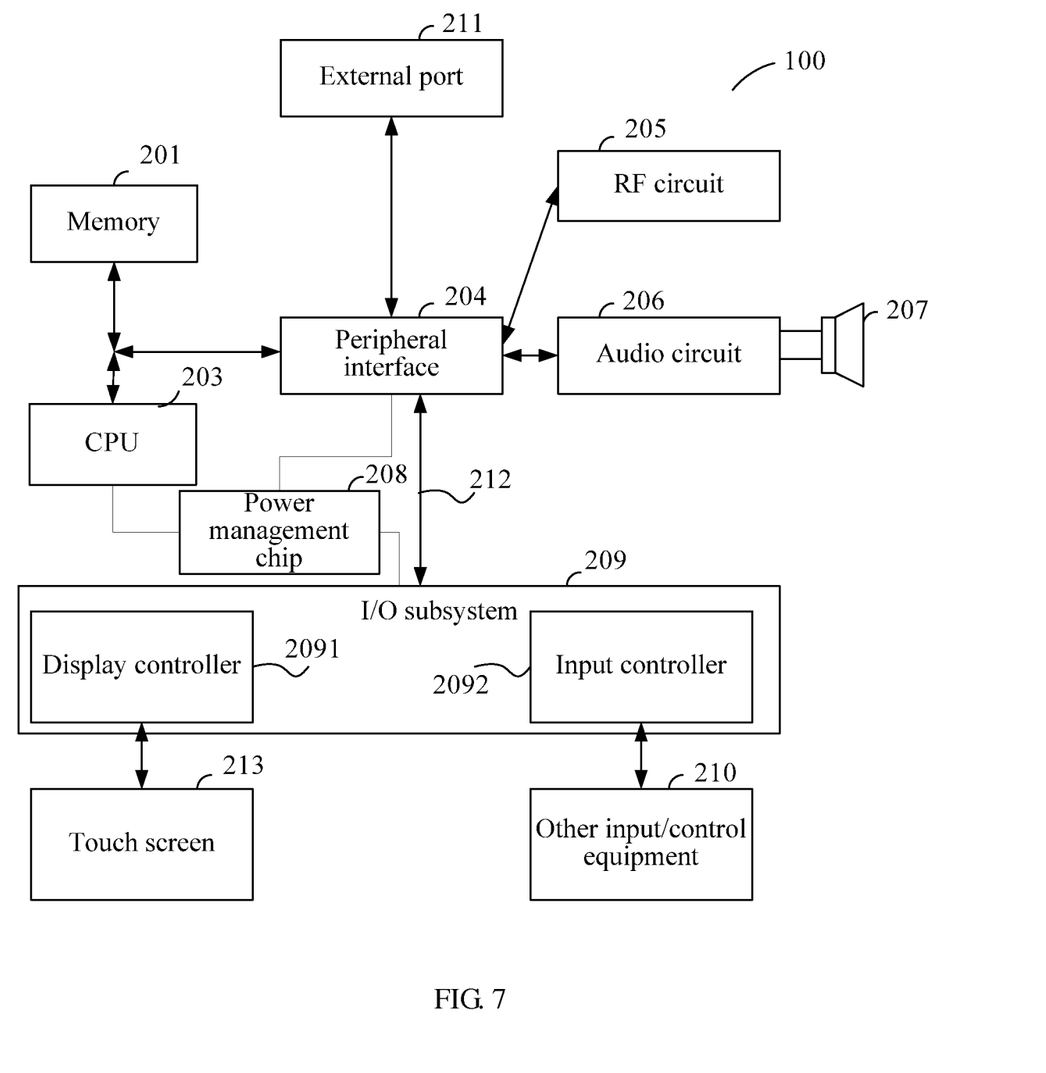
FIG. 7 is a schematic structural diagram of a mobile phone in Embodiment 3 of the present invention.

As shown in FIG. 7, a mobile phone is taken as an example in this embodiment to describe the present invention in detail.

It may be understood that, a mobile phone 100 shown in the figure is merely an example of a mobile terminal, and the mobile phone 100 may have components more or less than components shown in the figure, may combine two or more components, or may have different component configurations. Each component shown in the figure may be implemented through hardware including one or more signal processing circuits and/or dedicated integrated circuits, software or a combination of the hardware and software.

A mobile phone is taken as an example for detailed description. FIG. 7 is a schematic structural diagram of a mobile phone for processing a message according to Embodiment 3 of the present invention. As shown in FIG. 7, the mobile phone includes a memory 201, a central processing unit (CPU for short below) 203, a peripheral interface 204, an RF circuit 205, an audio circuit 206, a loudspeaker 207, a power management chip 208, an input/output (I/O) subsystem 209, other input/control equipment 210, and an external port 204; these components communicate through one or more communication buses or signal wires 212.

It may be noted that, the mobile phone provided in the embodiment is merely an example of the mobile terminal. The mobile terminal involved in the embodiment of the present invention may have components more or less than components shown in FIG. 7, may combine two or more components, or may have different component configurations or settings. Each component may be implemented in hardware including one or more signal processing circuits and/or dedicated integrated circuits, software or a combination of the hardware and software.

The mobile phone for processing a message provided by the embodiment is described in detail below.

The memory 201: the memory 201 may be accessed by the CPU 203, the peripheral interface 204, and so on; the memory 201 may include a high speed random access memory, and may also include a nonvolatile memory, such as one or more disk memory devices, flash memory devices, or other volatile solid memory devices.

The peripheral interface 204: the peripheral interface may connect input and output peripherals of the equipment to the CPU 203 and the memory 201.

The I/O subsystem 209: the I/O subsystem 209 may connect the input and output peripherals on the equipment, such as a touch screen 213 (which is equivalent to a display in the above embodiment) and other input/control equipment 210, to the peripheral interface 204. The I/O subsystem 209 may include a display controller 2091 and one or more input controllers 2092 for controlling other input/control equipment 210. The one or more input controllers 2092 receive electric signals from other input/control equipment 210 or send electric signals to other input/control equipment 210; other input/control equipment 210 may include a physical button (press button, rocker button, and so on), a dial, a slide switch, an operation rod and a tap scroll wheel. It may be noted that, the input controller 2092 may be connected to any one of a keypad, an infrared port, a USB interface, and an indication equipment such as a mouse.

A touch screen 213: the touch screen 213 is the input interface and output interface between a mobile terminal and a user, and displays visual output to the user, where the visual output may include a graph, a text, an icon, a video, and so on.

The display controller 2091 in the I/O subsystem 209 receives an electric signal from the touch screen 213 or sends an electric signal to the touch screen 213. The touch screen 213 detects a touch on the touch screen. The display controller 2091 converts the detected touch into interaction with a user interface object displayed on the touch screen 213, that is, to implement human-machine interaction. The user interface object displayed on the touch screen 213 may be an icon for a running game, an icon for connecting to a corresponding network, and so on. It may be noted that, the equipment may further include an optical mouse. The optical mouse is a touch-sensitive surface that does not display visual output, or the extension of a touch-sensitive surface formed by the touch screen.

The RF circuit 205 is mainly configured to establish communication between the mobile phone and a wireless network (namely, a network side), so as to implement data receiving and transmitting between the mobile phone and the wireless network, such as receiving and sending a short message service and an email. Specifically, the RF circuit 205 receives and transmits an RF signal, where the RF signal is also referred to as an electromagnetic signal. The RF circuit 205 converts an electric signal into an electromagnetic signal or converts an electromagnetic signal into an electric signal, and communicates with a communication network or another equipment through the electromagnetic signal. The RF circuit 205 may include known circuits for performing these functions, which include, but are not limited to, an antenna system, an RF transceiver, one or more amplifiers, a tuner, one or more oscillators, a digital signal processor, a CODEC chip set, and a subscriber identity module (SIM).

The audio circuit 206 is mainly configured to receive audio data from the peripheral interface 204, convert the audio data into an electric signal, and send the electric signal to the loudspeaker 207.

The loudspeaker 207 is configured to restore an audio signal received from the wireless network by the mobile phone through the RF circuit 205 into a sound and play the sound to the user.

The power management chip 208 is configured to supply power to the CPU 203, the I/O subsystem and the hardware connected to the peripheral interface, and performs power management.

Figure 8:
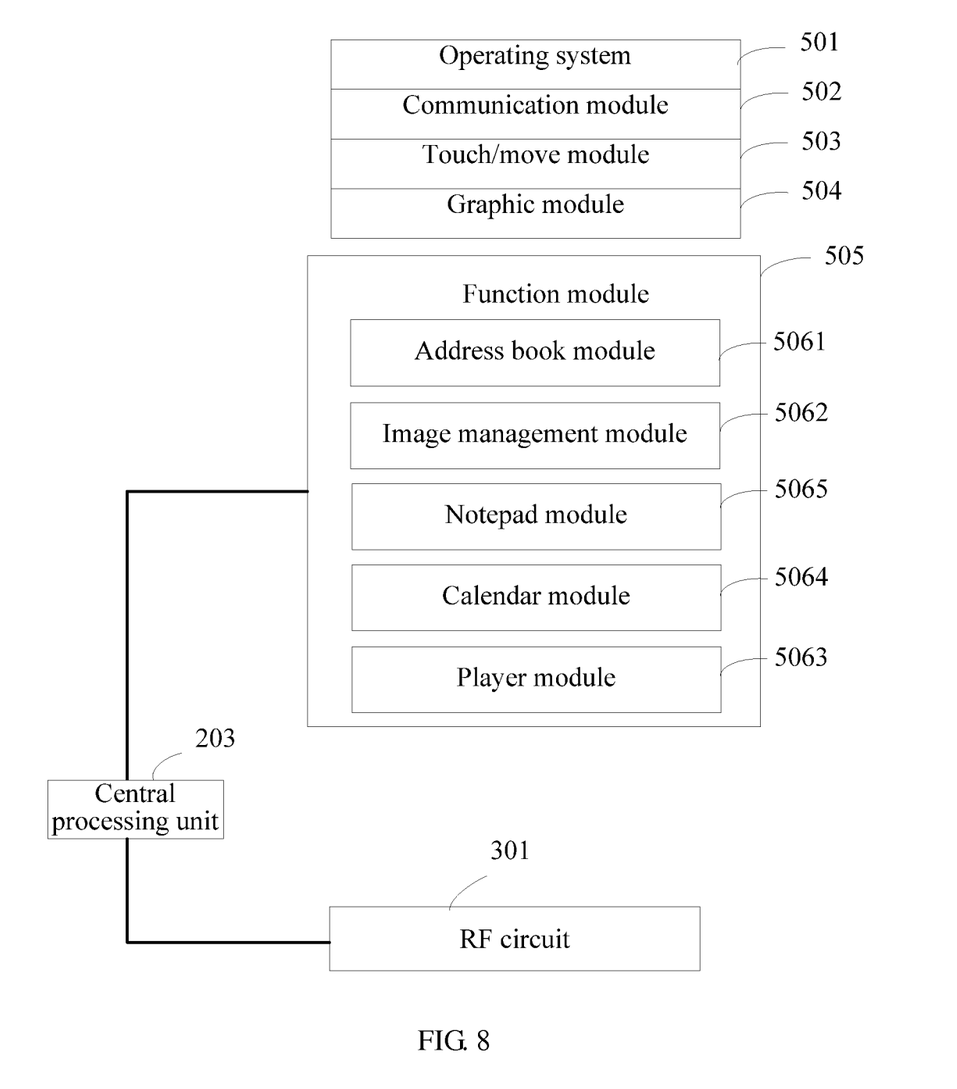
FIG. 8 is a schematic structural diagram of a mobile phone in Embodiment 3 of the present invention.

FIG. 8 is a structural diagram of an interior of the mobile phone. In the embodiment of the present invention, software components stored in the memory 201 may include an operating system 501, a communication module 502, a touch/move module 503, a graphic module 504 and a function module 506.

The operating system 501 (for example, Darwin, RTXC, LINUX, UNIX, OS X, WINDOWS, or embedded operating systems such as VxWorks) includes various software components and/or drivers for controlling and managing general system tasks (for example, memory management, memory equipment control, power management, and so on), and facilitates communication between various hardware and software components.

The communication module 502 facilitates communication with another equipment through one or more external ports 211, and also includes various software components for processing data received by the RF circuit 205 and/or the external port 211.

The touch/move module 503 may detect a touch on the touch screen 213 (interacting with the display controller 2091) and other touch-sensitive equipment (such as a touch pad or physical click scroll wheel). The touch/move module 503 includes various software components for performing various operations related to touch detection. The foregoing operations may be, for example, determining whether a touch occurs, determining whether the touch moves and tracking the movement on the touch screen 213, and determining whether the touch is disconnected (that is, whether the touch is ended). The determining the movement of a touch point may include determining a rate (amplitude), a speed (amplitude and direction) and/or an accelerated speed (change of amplitude and/or direction) of a touch point. These operations may be applied to a single touch (for example, touch with one finger) or multiple synchronous touches (for example, "multiple touches"/multi-finger touch). In some embodiments, the touch/move module 503 and the display controller 2091 further detect touches on a touch pad.

The graphic module 504 includes various known software components for displaying graphs on the touch screen 213, including components for changing brightness of the displayed graphs, for example, receiving a command from the central processing unit 203 and displaying graphic user interfaces of various software on the touch screen 213.

The function module 506 may specifically include at least one of the following modules: an address book module 5061, configured to store a contact of a vCard format or a vcf format, and in combination with the graphic module 504, display information of the contact on the touch screen 213; an image management module 5062, configured to store received image information in various image formats (such as a JPG format and a BMP format), and in combination with the graphic module 504, display content of an image selected by the user on the touch screen 213; a player module 5063, configured to store received data in various audio and video formats (such as an AVI format), in combination with the graphic module 504, display content of the audio and video selected by the user on the touch screen 213, and play a sound through the loudspeaker 207; a calendar module 5064, configured to store data (such as data in a vCalendar format) related to a calendar, for example, receiving user input, and storing data such as meeting prompt and calendar prompt, and in combination with the graphic module 504, display data related to the calendar on the touch screen 213; and a notepad module 5065, configured to store data in a TXT format.

The RF circuit 205 receives a message sent by the network side or by another equipment, where the message includes an email, a short message service or an instant message, and specifically, the message may be the message in Embodiment 1 or Embodiment 2. It may be understood that, the received message may also be a message of another type, which is not limited in the embodiment of the present invention. Persons skilled in the art may learn that, the received message may carry data of various data types. It may be data of only one data type, or data of two or more data types.

The central processing unit 203 identifies the data type of the data in the message received by the RF circuit 205, and stores the data into a function module corresponding to the data type of the data according to a corresponding relationship list, where the corresponding relationship list is a list of correspondence between data types and function modules. The function module 506 may specifically be at least one of the address book module 5061, the image management module 5062, the player module 5063, the calendar module 5064 and the notepad module 5065. It may be understood that, in the embodiment of the present invention, the central processing unit 203 may identify data in various formats in the manner described in the foregoing embodiments, and details are not described herein again.

Specifically, for example, if the central processing unit 203 identifies that a short message service includes data in a vCard format, a TXT format, a JPG format and an AVI format, then according to the corresponding relationship list 1 (as the corresponding relationship list 1 described in Embodiment 1), the central processing unit 203 sends the data in the vCard format to the address book module 5061, sends the data in the TXT format to the notepad module 5065, sends the data in the JPG format to the image management module 5062, and sends the data in the AVI format to the player module 5063. Each of the above function modules stores the data forwarded by the central processing unit 203. It may be understood that, after receiving an operation command from the central processing unit 203, the function module 506 may display the data on the touch screen 213 according to a preset form through the graphic module 504, so that the user performs a specific operation on the data.

Optionally, the central processing unit 203 may extract a data attribute of the data from the received message. The data attribute may specifically include a sender of the message, and may also specifically include the sender and the sending time of the message. The central processing unit 203 may send the data of various data types and the data attribute of the data to the function module 506 corresponding to the data type of the data. The touch screen 213 may display the data and the data attribute of the data in the preset form on the touch screen 213 through the graphic module 504 according to the operation command of the central processing unit 203. The specific technical solution is described in detail in Embodiment 1, and details are not described herein again.

Optionally, the central processing unit 203 may determine whether the data to be forwarded is already stored in the function module 506. If the central processing unit 203 determines that the data is already stored in the function module 506, the central processing unit 203 does not forward the data; if the data is not yet stored in the function module 506, the central processing unit 203 forwards the data to the function module 506. The central processing unit 203 may command the graphic module 504 to invoke a GUI interface, command the display controller 2091 to control the touch screen 213 to display the GUI interface and prompt the user of information, where the prompt information is specifically used to prompt the user that the data is already stored in the function module 506, prompt the user whether to perform subsequent management operations, such as combining data and deleting data. It may be understood that, the specific internal structure of the central processing unit 203 may be the same as the specific structure form in Embodiment 2, and details are not described herein again.

In the above embodiment, the central processing unit 203 may be a Pentium processor or an Itanium processor manufactured by the Intel Corporation.

With the embodiment of the present invention, related data, such as a contact business card, schedule information and text information, is intelligently extracted from the received message, and a prompt is given to the user in a related application program, thereby enhancing the intelligent interaction capability between the mobile terminal and the user and improving the transaction processing efficiency of the mobile terminal.

In the above embodiments of the present invention, the mobile terminal includes, but is not limited to, a mobile communication equipment, such as a mobile phone, a personal digital assistant (PDA) and a tablet.

It may be noted that persons of ordinary skill in the art may understand that all or part of processes in the methods of the above embodiments may be implemented by a computer program instructing relevant hardware. The program may be stored in a computer readable storage medium and when the program is executed, the processes of the method embodiments may be included. The storage medium may be a magnetic disk, an optical disk, a Read-Only Memory (Read-Only Memory, ROM), a Random Access Memory (RAM), and the like.

A method and a mobile terminal for acquiring and processing data in a message provided by the present invention are described in detail above, the principle and implementation of the present invention are illustrated through specific embodiments herein, and the description of the above embodiments are merely for better understanding of method and the core idea of the present invention. Meanwhile, persons of ordinary skill in the art may make variations in terms of the specific implementation and the application scope according to the idea of the present invention. In conclusion, content of this specification should not be construed as a limitation to the present invention.

What is claimed is:

1. A method for processing data in a multimedia message implemented by a mobile terminal, wherein the method comprises:

receiving a multimedia message sent by a network side or another equipment, wherein the multimedia message carries formatted data, wherein the multimedia message comprises an email, a short message service, or an instant message;

identifying at least one of the file formats of the formatted data used to encode the formatted data within the multimedia message when the multimedia message comprises a plurality of file formats of the formatted data; and storing the formatted data for the at least one of the file formats into a function module that corresponds to the at least one of the file formats used to encode the formatted data according to a corresponding relationship list when the multimedia message comprises the plurality of file formats, and wherein the corresponding relationship list is a list that maps the file format of the formatted data to the function module used to store the formatted data.

2. The method according to claim 1, wherein after storing the formatted data into the function module that corresponds to the at least one of the file formats used to encode the formatted data according to the corresponding relationship list, the method further comprises prompting, by the function module, a user of the stored formatted data according to a preset form to perform a management operation on the formatted data.

3. The method according to claim 1, wherein the corresponding relationship list is stored at the network side.

4. The method according to claim 3, wherein storing the formatted data into the function module that corresponds to the at least one of the file formats used to encode the formatted data according to the corresponding relationship list when the corresponding relationship list is stored at the network side comprises:

acquiring information of the function module corresponding to the file format used to encode the formatted data from the network side; and sending the formatted data to the function module.

5. The method according to claim 4, wherein after the sending the formatted data to the function module that corresponds to the at least one of the file formats used to encode the formatted data according to the corresponding relationship list and before storing the formatted data into the function module, the method further comprises:

determining whether the formatted data is the same as a stored data already stored in the function module; and prompting the user to perform the management operation when the formatted data is already stored.

6. The method according to claim 5, wherein after identifying the file format used to encode the formatted data within the multimedia message, and before storing the formatted data into the function module that corresponds to the at least one of the file formats used to encode the formatted data according to the corresponding relationship list, the method further comprises extracting a data attribute from the formatted data in the multimedia message and storing the formatted data and the data attribute of the formatted data into the function module corresponding to the at least one of the file formats used to encode the formatted data.

7. The method according to claim 6, wherein the data attribute refers to a sender of the multimedia message.

8. The method according to claim 1, wherein the at least one of the file formats used to encode the formatted data comprises at least one of a text (TXT) format, a virtual Card (vCard) format, a virtual Calendar (vCalendar) format, a Bitmap (BMP) format, a Joint Photographic Expert Group (JPG) format, an Audio Video Interleaved (AVI) format, Real Media Variable Bitrate (RMVB) format, and a Moving Picture Experts Group (MPEG) format.

9. A mobile terminal comprising:

a memory that comprises at least one function module, wherein the function module is configured to store a formatted data sent by a central processing unit;

a radio frequency (RF) circuit configured to receive a multimedia message, wherein the multimedia message carries formatted data, wherein the multimedia message comprises an email, a short message service, or an instant message; and the central processing unit configured to:
  identify at least one of the file formats used to encode the formatted data within the multimedia message when the multimedia message comprises a plurality of file formats of the formatted data; and
  store the formatted data of the at least one of the file formats into the function module that corresponds to the at least one of the file formats used to encode the formatted data according to a corresponding relationship list when the multimedia message comprises the plurality of file formats, and
  wherein the corresponding relationship list is a list that maps the file format of the formatted data to the function module used to store the formatted data.

10. The mobile terminal according to claim 9, wherein the function module comprises at least one of a notepad module, an address book module, a calendar module, an image management module, and a player module.

11. The mobile terminal according to claim 9, wherein the central processing unit comprises:
  a corresponding relationship storing module configured to store the list that maps the at least one of the file formats of the formatted data to the function module used to store the formatted data;
  an identification module configured to identify the at least one of the file formats used to encode the formatted data within the multimedia message; and
  a forwarding module configured to store the formatted data into the corresponding function module according to the corresponding relationship list.

12. The mobile terminal according to claim 10, further comprising a display configured to display the formatted data stored in the function module to a user according to an operation command of the central processing unit.

13. The mobile terminal according to claim 10, wherein the central processing unit is further configured to extract a data attribute of the formatted data from the received multimedia message and send the formatted data and the data attribute of the formatted data to the function module corresponding to the at least one of the file formats used to encode the formatted data, and wherein the data attribute comprises a sender or sending time of the multimedia message.

14. The mobile terminal according to claim 9, wherein the central processing unit is further configured to determine whether the formatted data is the same as a stored data already stored in the function module, and wherein the function module is further configured to store the formatted data when the central processing unit determines that the function module has not already stored the formatted data.

15. The mobile terminal according to claim 9, wherein the at least one of the file formats used to encode the formatted data comprises at least one of a text (TXT) format, a virtual Card (vCard) format, a virtual Calendar (vCalendar) format, a Bitmap (BMP) format, a Joint Photographic Expert Group (JPG) format, an Audio Video Interleaved (AVI) format, a Real Media Variable Bitrate (RMVB) format, and a Moving Picture Experts Group (MPEG) format.

\* \* \* \* \*

UNITED STATES PATENT AND TRADEMARK OFFICE
CERTIFICATE OF CORRECTION

PATENT NO. : 8,718,609 B2  Page 1 of 1
APPLICATION NO. : 13/731790
DATED : May 6, 2014
INVENTOR(S) : Ning Yang and Yi Ding It is certified that error appears in the above-identified patent and that said Letters Patent is hereby corrected as shown below:

On the Title Page item (71), "Applicant" should read:

Huawei Device C. Ltd., Shenzhen CN

In the Claims:

Column 14, Line 61, Claim 8 should read:

The method according to claim 1, wherein the at least one of the file formats used to encode the formatted data comprises at least one of a text (TXT) format, a virtual Card (vCard) format, a virtual Calendar (vCalendar) format, a Bitmap (BMP) format, a Joint Photographic Expert Group (JPG) format, an Audio Video Interleaved (AVI) format, a Real Media Variable Bitrate (RMVB) format, and a Moving Picture Experts Group (MPEG) format.

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,718,609 B2  Page 1 of 1
APPLICATION NO. : 13/731790
DATED : May 6, 2014
INVENTOR(S) : Ning Yang and Yi Ding It is certified that error appears in the above-identified patent and that said Letters Patent is hereby corrected as shown below:

On the Title Page item (71), "Applicant" should read:

Huawei Device Co. Ltd., Shenzhen CN

In the Claims:

Column 14, Line 61, Claim 8 should read:

The method according to claim 1, wherein the at least one of the file formats used to encode the formatted data comprises at least one of a text (TXT) format, a virtual Card (vCard) format, a virtual Calendar (vCalendar) format, a Bitmap (BMP) format, a Joint Photographic Expert Group (JPG) format, an Audio Video Interleaved (AVI) format, a Real Media Variable Bitrate (RMVB) format, and a Moving Picture Experts Group (MPEG) format.

This certificate supersedes the Certificate of Correction issued October 21, 2014.

Signed and Sealed this
Seventeenth Day of February, 2015

Michelle K. Lee
*Deputy Director of the United States Patent and Trademark Office*